(12) United States Patent
Chacko et al.

(10) Patent No.: US 8,896,986 B2
(45) Date of Patent: Nov. 25, 2014

(54) METHOD OF IMPROVING ELECTROMECHANICAL INTEGRITY OF CATHODE COATING TO CATHODE TERMINATION INTERFACES IN SOLID ELECTROLYTIC CAPACITORS

(75) Inventors: Antony P. Chacko, Greer, SC (US); John E. McConnell, Pelzer, SC (US); Philip M. Lessner, Newberry, SC (US); Randolph S. Hahn, Simpsonville, SC (US); John Bultitude, Greenville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 244 days.

(21) Appl. No.: 13/114,433

(22) Filed: May 24, 2011

(65) Prior Publication Data

US 2011/0292572 A1     Dec. 1, 2011

Related U.S. Application Data

(60) Provisional application No. 61/348,318, filed on May 26, 2010.

(51) Int. Cl.
| | |
|---|---|
| *H01G 4/228* | (2006.01) |
| *H01G 9/04* | (2006.01) |
| *H01G 9/00* | (2006.01) |
| *H01G 9/012* | (2006.01) |
| *H01G 9/042* | (2006.01) |
| *H01G 9/15* | (2006.01) |

(52) U.S. Cl.
CPC ............. *H01G 9/012* (2013.01); *H01G 9/0425* (2013.01); *Y02E 60/13* (2013.01); *H01G 9/15* (2013.01)
USPC .......................................... 361/533; 361/540

(58) Field of Classification Search
CPC .......... H01G 9/042; H01G 9/012; H01G 9/15
USPC ........................................ 361/533, 532, 540
See application file for complete search history.

(56) References Cited

U.S. PATENT DOCUMENTS

| | | | | |
|---|---|---|---|---|
| 4,794,491 A | * | 12/1988 | Saiki | .............................. 361/532 |
| 5,062,896 A | * | 11/1991 | Huang et al. | ............. 106/287.19 |
| 5,424,909 A | * | 6/1995 | Kuriyama | ...................... 361/534 |

(Continued)

FOREIGN PATENT DOCUMENTS

| | | | |
|---|---|---|---|
| JP | 58053965 A | * | 3/1983 |
| JP | 02283010 A | * | 11/1990 |
| JP | 04042914 A | * | 2/1992 |
| JP | 2005021974 A | * | 1/2005 |

OTHER PUBLICATIONS

Yeo, In Hong; International Preliminary Report on Patentability, PCT/US2011/038197, Sep. 11, 2012.

(Continued)

*Primary Examiner* — David M Sinclair
(74) *Attorney, Agent, or Firm* — Joseph T. Guy; Perkins Law Firm, LLC

(57) ABSTRACT

A solid electrolytic capacitor with an anode and a dielectric on the anode. A cathode is on the dielectric and a conductive coating on the dielectric. A cathode lead is electrically connected to the conductive coating by an adhesive selected from the group consisting of a transient liquid phase sinterable material and polymer solder.

22 Claims, 2 Drawing Sheets

(56) References Cited

U.S. PATENT DOCUMENTS

| | | | |
|---|---|---|---|
| 5,830,389 A * | 11/1998 | Capote et al. | 252/512 |
| 5,853,622 A * | 12/1998 | Gallagher et al. | 252/512 |
| 5,922,397 A | 7/1999 | Brandt | |
| 5,964,395 A | 10/1999 | Glovatsky et al. | |
| 6,068,782 A | 5/2000 | Brandt | |
| 6,465,082 B1 | 10/2002 | Takezawa et al. | |
| 6,704,189 B2 * | 3/2004 | Yoshii et al. | 361/308.1 |
| 6,916,433 B2 | 7/2005 | Mitani et al. | |
| 6,972,943 B2 | 12/2005 | Kato et al. | |
| 6,975,503 B2 * | 12/2005 | Abe et al. | 361/533 |
| 7,108,729 B2 * | 9/2006 | Kanetake | 29/25.03 |
| 7,172,711 B2 * | 2/2007 | Nguyen | 252/511 |
| 7,471,504 B2 * | 12/2008 | Takatani et al. | 361/528 |
| 7,495,890 B2 | 2/2009 | Chacko | |
| 2006/0151580 A1 * | 7/2006 | Flint | 228/244 |
| 2008/0116416 A1 | 5/2008 | Chacko | |
| 2008/0232035 A1 | 9/2008 | Biler | |
| 2009/0185941 A1 | 7/2009 | Breznova | |

OTHER PUBLICATIONS

Sang Min Lee, Written Opinionof The International Searching Authority, PCT/US2011/038216, Dec. 26, 2011.

Sang Min Lee, International Search Report, PCT/US2011/038216, Dec. 26, 2011.

* cited by examiner

METHOD OF IMPROVING ELECTROMECHANICAL INTEGRITY OF CATHODE COATING TO CATHODE TERMINATION INTERFACES IN SOLID ELECTROLYTIC CAPACITORS

CROSS-REFERENCE TO RELATED APPLICATIONS

The present application claims priority to U.S. Provisional Application No. 61/348,318 filed May 26, 2010.

BACKGROUND

The present invention is related to an improved method of forming a solid electrolytic capacitor and an improved capacitor formed thereby. More specifically, the present invention is related to a method of improving the electrical and mechanical integrity of a cathode to a cathode lead using a metallurgical adhesive, selected from transient liquid phase sintering and polymer solder adhesives, to form metallurgical bonds The construction and manufacture of solid electrolytic capacitors is well documented. In the construction of a solid electrolytic capacitor a valve metal typically serves as the anode. The anode body can be either a porous pellet, formed by pressing and sintering a high purity powder, or a foil which is etched to provide an increased anode surface area. An oxide of the anode, which serve as the dielectric of the capacitor, is typically electrolytically formed to cover at least a majority of the surfaces of the anode. The solid cathode electrolyte is typically chosen from a very limited class of materials, to include manganese dioxide and intrinsically conductive polymers such as polyaniline, polypyrrole, polythiophene etc. The solid cathode electrolyte is applied so that it covers at least a majority of the dielectric surfaces. An important feature of the solid cathode electrolyte is that it can be made more resistive by exposure to high temperatures. This feature allows the capacitor to heal leakage sites by Joule heating. The solid electrolyte is typically not readily adhered to a lead frame or circuit trace so in addition to the solid electrolyte the cathode of a solid electrolyte capacitor typically comprises several layers which are external to the solid electrolyte to facilitate adhesion. These layers typically include a carbon layer; a layer containing a highly conductive metal, typically silver, bound in a polymer or resin matrix; a conductive adhesive layer such as solder or a silver adhesive which is then adhered to a highly conductive metal lead frame. It is important that the solid electrolyte be of sufficient buildup and density to prevent the layers overlaying the solid electrolyte from penetrating the solid electrolyte and contacting the dielectric. One reason for this is that these outer layers do not necessarily exhibit the healing properties required for a material directly in contact with the dielectric. Thus, the ability to control the buildup, morphology, uniformity, and density of the solid electrolyte is critical to manufacturing a reliable solid electrolytic capacitor. The various layers of the external cathode also serve to protect the dielectric from thermo-mechanical damage that may occur during subsequent processing, board mounting, or customer use.

In the case of conductive polymer cathodes the conductive polymer is typically applied by chemical oxidation polymerization, electrochemical oxidation polymerization or spray techniques with other less desirable techniques being reported.

The carbon layer serves as a chemical buffer between the solid electrolyte and the silver layer. Critical properties of the carbon layer include adhesion to the underlying layer, wetting of the underlying layer, penetration of the underlying layer, bulk conductivity, interfacial resistance, compatibility with the silver layer, suitable buildup, and suitable mechanical properties.

The silver layer, or a suitable very high conductive layer, serves to conduct current to the lead frame from the areas of the cathode not directly connected to the lead frame. The critical characteristics of this layer are high conductivity, adhesive strength to the carbon layer, wetting of the carbon layer, and suitable mechanical properties. Compatibility with the subsequent layers employed in the assembly and encapsulation of the capacitor are also critical.

An electrically conductive adhesive is used to attach the cathode layer to a lead frame. The electrical properties of the capacitor can be affected if the mechanical integrity of the adhesive/lead frame connection is degraded during assembly and post assembly processing. The adhesive properties of the conductive adhesive, the solder coating on the lead frame, the surface characteristics of lead frame, the coefficient of thermal expansion of the lead frame etc., need to be carefully controlled in order to obtain durable negative connection integrity. The adhesive/lead frame interface is subjected to various thermo mechanical stresses during molding, curing, aging, surface mount testing, solder reflow etc. These thermo mechanical stresses, and the low adhesive strength of the conductive adhesive, often cause a break in the electrical contact between the cathode and lead frame. Adhesives with higher adhesive strengths and lower concentration of conductive particles are able to withstand the stress and maintain mechanical integrity. However, there is trade-off between increasing adhesion and increasing electrical conductivity.

Conductive adhesives are heavily filled with silver particles to get maximum conductivity. Increasing the silver loading will improved the electrical properties but decreases binder/resin concentration in the adhesive which is detrimental to adhesion. Increasing the resin portion will increase adhesion but to the detriment of electrical properties, particularly, conductivity.

U.S. Pat. No. 6,972,943 attempts to circumvent the conflict between adhesion and conductivity of the adhesive by modifying the lead frame surface. The method of the invention in the patent provides grooves and holes in the lead frame so as to have good mechanical integrity between the two surfaces.

U.S. Pat. No. 6,916,433 attempts to improve performance by using conductive fillers with dendrites or protrusions to enhance contact with electrodes and an elastic adhesive resin for enhanced flexibility. The preferred elastic adhesive is a thermosetting resin comprising denatured silicon resin with a dispersed epoxy resin, available from Cemedyne Co. Ltd.

U.S. Pat. No. 7,495,890 discloses a method of improving cathode connection integrity by using secondary adhesives. Although this method improves the cathode connection integrity, higher temperature adhesion performance is limited by the thermal softening temperatures of the polymeric materials in these adhesives.

The polymeric resin in these adhesives helps to form adhesive bonds between the highly conductive cathode layer and the lead frame. One of the weaknesses of the polymeric resin is that they tend to degrade at high temperatures which affects the cathode connection integrity. Another weakness of these metal particle filled adhesives is that the conduction mechanism is percolation assisted by forming a connection between binder coated particles. Due to this binder interference, stable interconnection with the lead frame or between particles is an issue especially when these parts are subjected to thermal, mechanical or environmental stress. On humidity exposure, moisture sorbed by the binders can swell the binders cause an increase in ESR due to increased silver particle to silver particle distance. Silver migration is another issue when conductive adhesive is a silver filled adhesive. Silver migration can lead to an increase in leakage current and increase in ESR. Solders can be used for forming a metallurgical bond between the lead frame and the cathode layer. However, most of the solders available are not suitable for high temperature applications either due to their low melting point or due to the presence of Pb. A need therefore exists for improved reliability cathode connections for high temperature applications.

Through diligent research the present inventors have developed a method of improving high temperature adhesive strength and ESR stability between the lead frame and the cathode layer

SUMMARY

It is an object of the present invention to provide a capacitor with increase adhesion between the lead frame and the cathode layer.

It is another object of the present invention to provide a capacitor with improved high temperature adhesion performance.

A particular feature of the present invention is the ability to provide improvements with minor changes to the manufacturing method and with improved product yields due to improved thermo mechanical and electrical properties.

It is another object of the present invention to provide a capacitor which maintains an electrically stable cathode/adhesive/lead frame interface when exposed to high humidity.

It is another object of the present invention to provide a capacitor wherein lead frame adhesion to the cathode can be done rapidly thereby increasing manufacturing efficiencies.

These and other advantages, as will be realized, are provided in a solid electrolytic capacitor. The capacitor comprises an anode and a dielectric on the anode. A cathode is on the dielectric and a conductive coating on said dielectric. A cathode lead is electrically connected to the conductive coating by an adhesive selected from the group consisting of a transient liquid phase sinterable material and polymer solder.

Yet another embodiment is provided in a method for forming a capacitor. The method includes the steps of:
providing an anode;
forming a dielectric on the anode;
applying a cathode on the dielectric; and
electrically connecting a cathode lead to the cathode with an adhesive selected from the group consisting of a transient liquid phase sinterable material and polymer solder.

Yet another embodiment is provided in a solid electrolytic capacitor. The capacitor has an anode and a dielectric on the anode. A cathode is on the dielectric and a conductive coating is on the cathode. A cathode lead is electrically connected to the conductive coating by a metallurgical bond formed from a transient liquid phase sintered material which is preferably formed under compression.

DETAILED DESCRIPTION

Figure 1:
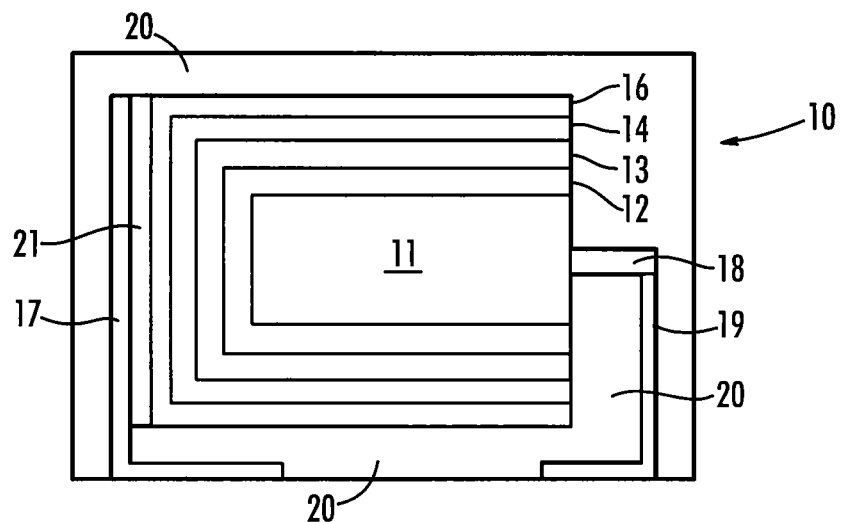
FIG. 1 is a cross-sectional schematic view of an embodiment of the invention.

The present invention mitigates the deficiencies of the prior art by providing a capacitor with an improvement in adhesion to the cathodic lead frame through the use of a metallurgical adhesive selected from transient liquid phase sintering and polymer solder adhesives. The metallurgical adhesives increase productivity without detriment to the electrical properties of the capacitor.

It has now been found that the metallurgical adhesives can be used for attaching cathode layers to a cathode lead in solid electrolytic capacitors. It has also been found that the metallurgical adhesives form a metallurgical bond between a cathode layer and cathode. In a particularly preferred embodiment a solid electrolytic capacitor with a metal plated cathode, preferably a nickel plated cathode, forms metallurgical bonds at the interfaces when the metallurgical adhesives are incorporated. The metal plated layer is preferably applied by reverse bias electroplating.

Metallurgical adhesives are conductive adhesives which make interconnection through metallic bonds instead of chemical bonds as in metal filled polymeric adhesives. Because the metal particles in these adhesives are sintered together, these adhesives enable conduction by metallic conduction instead of percolation assisted conduction as in metal filled polymeric adhesives. For the purposes of this disclosure metallurgical adhesives include transient liquid phase sinterable materials or polymer solder. By using these metallurgical adhesives, metallurgical bonds can be formed between the lead frame and the cathode layers.

Transient liquid phase sinterable adhesives are blends of low temperature melting metals or alloys and high temperature melting metals or alloys which can be sinterable at low temperatures. Transient liquid phase sintering conductive adhesive formulations disclosed in U.S. Pat. No. 5,853,622 combine TLPS materials with cross linking polymers to create a thermal and electrical bond having intermetallic interfaces between the metal surfaces created by the TLPS process. The spraying of two mating surfaces with a low temperature melting material on one surface and a higher melting temperature on the mating surface, with both surfaces being compatible with the TLPS process, thereby forming a joint when heating to the melting point of the lower temperature material is discussed in U.S. Pat. No. 5,964,395. These patents describe the materials and processes of TLPS with respect to forming a conductive bond.

Transient Liquid Phase Sintering adhesives (TLPS) are conductive materials that are distinguished from solders. Solders are alloys which do not undergo a change in composition during reflow. TLPS materials are mixtures of two or more metals or metal alloys prior to exposure to elevated temperatures. The second distinguishing characteristic of TLPS materials is that the melting point of the material is dependent on the thermal history of the material. TLPS materials exhibit a low melting point prior to exposure to elevated temperatures, and a higher melting point following exposure to these temperatures. The initial melting point is the result of the low temperature metal or an alloy of two low temperature metals. The second melting temperature is that of the intermetallic formed when the low temperature metal or alloy, forms a new alloy with a high temperature melting point metal thereby creating an intermetallic having a higher melting point. TLPS materials form a metallurgical bond between the metal surfaces to be joined. Unlike tin/lead or lead (Pb) free solders, the TLPS conductive adhesives do not spread as they form the intermetallic joint. Rework of the TLPS system is very difficult due to the high secondary reflow temperatures.

A transient liquid phase sinterable adhesive can be used to attach a plated metal layer to a cathode lead. Commercially available transient liquid phase sinterable adhesive used in the electronics industry are filled with a mixture of low melting metal or alloys and high temperature melting metals or alloys. In addition to these sinterable metallic components, some amount of curable organic materials are also present to provide fluxing action and some initial tackiness. Transient liquid phase sinterable adhesives are available from Ormet Circuits Inc. and Creative Electron as noted suppliers.

TLPS comprise high temperature materials selected from copper, silver, aluminum, gold, platinum, palladium, beryllium, rhodium, nickel, cobalt, iron and molybdenum or a mixture or any combination thereof are suitable for use in transient liquid phase sintering conductive adhesives. High melting temperature materials have a melting point of at least 600° C.

TLPS further comprise a low melting temperature materials selected from tin, antimony, bismuth, cadmium, zinc, gallium, indium, tellurium, mercury, thallium, selenium, or polonium, or a mixture or an alloy of any two or more of these. Low melting temperatures materials have a melting point of no more than 500° C.

The lead (Pb) free transient liquid phase sintering adhesives preferably use either silver or copper as the high temperature component and a tin-bismuth alloy as the low temperature component.

The transient liquid phase sintering conductive adhesives are compatible with surface finishes containing silver, tin, gold, copper, platinum, palladium, nickel, or combinations thereof, either as lead frame finishes, component connections or inner electrodes to form an electronically conductive metallurgical bond between two surfaces. Suitable external lead or lead frame materials include phosphor bronze, copper, alloys of copper such as but not limited to beryllium copper, Cu194 and Cu192, as well as lead frames consisting of ferrous alloys such as but not limited to Alloy 42 and Kovar.

With transient liquid phase sintering adhesives in paste form thermo-compression bonding can be used to increase densities in the bond thereby forming more reliable joints than relying on temperature alone.

A particular advantage is the ability to use a low process time of 15 to 60 seconds at a temperature in the range of 225° C. to 300° C. in a single step making it suitable for automation. Robust joints can be created for the application of attaching external leads to the cathode using Transient Liquid Phase Sintering conductive adhesives with a one step low temperature in less than 60 seconds and in combination with thermo-compression bonding.

A polymer solder can be used to form metallurgical bonds between plated metal cathode layer and cathode lead. Polymer solder provides suitable solder wetting, particularly, on plated cathode layers. Thermosetting polymer in combination with high temperature alloy provides higher temperature properties. Henkel supplies such adhesives as epoxy solder.

Polymer solders may consist of conventional solder systems based on Pb/Sn alloy systems or more preferably lead free systems, such as Sn/Sb, which are combined with cross linking polymers which serve as cleaning agents. The cross-linked polymers also have the ability to form a cross linked polymer bond, such as an epoxy bond, that forms during the melting phase of the metals thereby forming a solder alloy and a mechanical polymeric bond. An advantage of polymer solders is that the polymeric bond provides additional mechanical bond strength at temperatures above the melting point of the solder, thus giving the solder joint a higher operating temperature of at least 5° C. above the melting point of the solder. Polymer solders combine current solder alloys with a cross linking polymer within the same paste to provide both a metallurgical bond and a mechanical bond when cured, such as by heating, to provide additional solder joint strength at elevated temperatures. However, the upper temperature limits and joint strength has been increased, just by the physical properties of the materials. A practical limit of 300° C. remains whereas the Transient Liquid Phase Sintering Conductive Adhesives can achieve higher temperatures.

Thermo compression bonding is also a particularly preferred processing method when using Polymer Solder because it assists in the formation of a high density metallurgical bond between the contacting surfaces. The advantages of a thermo-compression include a more robust bond with respect to secondary attachment processes and attachments with higher strength are achieved.

A compressive force of about 0.5 to 4.5 Kilograms/cm$^2$ (7.1 to 64 psi) and more preferably 0.6 to 0.8 Kilograms/cm$^2$ (8.5 to 11 psi) is sufficient for demonstration of the thermo-compression teachings herein. About 0.63 Kilograms/cm$^2$ (9 psi) is a particularly suitable pressure for demonstration of the teachings.

The present invention will be described with reference to the various figures which illustrate, without limiting, the invention.

In FIG. 1, a cross-sectional schematic view of a capacitor is shown as represented at 10. The capacitor comprises an anode, 11, preferably comprising a valve metal as described herein. A dielectric layer, 12, is provided on the surface of the anode, 11. The dielectric layer is preferably formed as an oxide of the valve metal as further described herein. Coated on the surface of the dielectric layer, 12, is a conductive layer, 13. The conductive layer preferably comprises conductive polymer, such as polyethylenedioxythiophene (PEDT), polyaniline or polypyrrole or their derivatives; manganese dioxide, lead oxide or combinations thereof. A carbon layer, 14, and silver layer or alternatively an plated layer, 16, provide electrical conductivity and provide a surface which is more readily adhered to the cathode terminal, 17, than is the cathode layer, 13. The metallurgical adhesive layer, 21, secures the cathode lead to the silver layer or plated layer. The plated layer can be from sputtered metal, chemical vapor deposited metal or electroplated metal with reverse bias electroplating most preferable.

The carbon layer together with the silver layer and adhesive layer provides a strongly adhered conductive path between the conductive layer, 13, and the cathode terminal, 17. An anode wire, 18, provides electrical contact between the anode, 11, and an anode terminal, 19. The entire element, except for the terminus of the terminals, is then preferably encased in a non-conducting material, 20, such as an epoxy resin.

The capacitor is illustrated in FIG. 1 as a discrete capacitor. In an alternate embodiment the anode wire, 18, and silver layer or plated layer, 16, may be in direct electrical contact with a circuit trace wherein elements of the circuit may constitute the cathode lead, anode lead or both. The capacitor may be embedded in a substrate or incorporated into an electrical component with additional functionality.

The carbon layer comprises a conductive composition comprising resin and carbon conductive particles. The carbon layer may also comprise adjuvants such as crosslinking additives, surfactants and dispersing agents. The resin, conductive carbon particles and adjuvants are preferably dispersed in an organic solvent or water to form a coating solution. The conductive carbon particles are preferably dispersed in an organic solvent. Preferably the organic solvent is present in an amount of 20-90 wt %. More particularly the organic solvent is present in an amount of 40-60 wt %. The organic solvent is preferable selected from glycol ethers, glycol ether ester, N-methyl pyrrolidone, dimethyl formamide, xylene, etc. A particularly preferred solvent is glycol ether ester due to the good polymer solubility and high boiling point.

The silver layer or plated layer provides a layer which is readily adhered to the lead frame. A silver layer comprises silver and a resin. It is most preferable that the silver layer be at least 5 μm thick. The silver composition of the silver layer is preferably about 40 wt % to no more than about 95 wt % based on the dry weight. Below about 40 wt % the conductivity is inadequate and above about 95 wt % the adhesion is unacceptable. It is more preferred that the silver content of the silver layer be at least 85 wt % to no more than 95 wt %. A plated metal layer selected from silver, tin, gold, copper, platinum, palladium, nickel or combinations thereof be used instead of silver layer and is preferred. A particularly preferred plated layer is nickel.

The metallurgical adhesive is typically used to adhesively attach the silver layer or plated metal layer to the lead frame which acts as the cathode lead.

Figure 2:
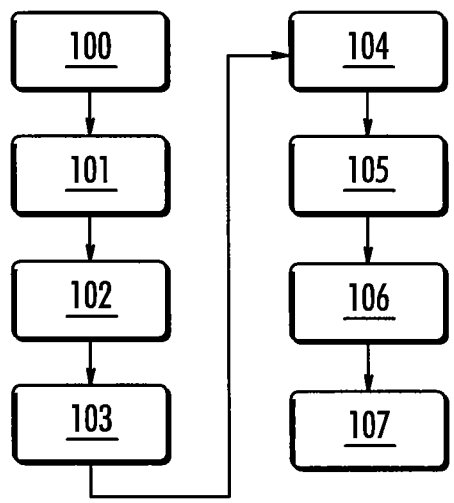
FIG. 2 is a flow chart representation of an embodiment of the invention.

The process for forming the capacitor is illustrated in FIG. 2.

In FIG. 2, the anode is formed at 100. The anode is a conductive material preferable formed from a valve metal or a conductive oxide of a valve metal. The valve-metal is preferably selected from niobium, aluminum, tantalum, titanium, zirconium, hafnium, tungsten and alloys or combinations thereof. Aluminum, tantalum, niobium and NbO are particularly preferred. Aluminum is typically employed as a foil while tantalum, niobium and niobium oxide are typically prepared by pressing a powder and sintering the powder to form a compact. For convenience in handling, the valve metal is typically attached to a carrier thereby allowing large numbers of elements to be processed at the same time. The anode is preferably etched to increase the surface area particularly if the anode is a foil such as aluminum foil. Etching is preferably done by immersing the anode into at least one etching bath. Various etching baths are taught in the art and the method used for etching the valve metal is not limited herein.

A dielectric is formed on the surface of the anode at 101. It is most desirable that the dielectric layer be an oxide of the anode metal. The oxide is preferably formed by dipping the anode into an electrolyte solution and applying a positive voltage to the anode. Electrolytes for the oxide formation can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the oxide on the valve metal including aqueous solutions of dicarboxylic acids, such as ammonium adipate are also known. Other materials may be incorporated into the oxide such as phosphates, citrates, etc. to impart thermal stability or chemical or hydration resistance to the oxide layer.

A conductive layer is formed, 102, on the surface of the oxide. The conductive layer acts as the cathode of the capacitor. The cathode can be an organic material such as 7,7',8,8'-tetracyanoquinodimethane complex. Particularly, the cathode can be intrinsically conducting polymers. Mentioned as exemplary polymers are polymerized aniline, polymerized pyrrole, polymerized thiophenes, and derivatives thereof. The cathode layer can also comprise manganese dioxide. The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

A particularly preferred conducting polymer is illustrated in Formula I:

FORMULA 1

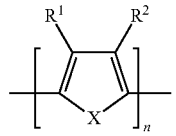

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

A particularly preferred polymer is 3,4-polyethylene dioxythiophene (PEDT).

The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art or by dipping into a slurry of polymer.

After conductive cathode layer formation, 102, a carbon layer is preferably applied, 103, preferably by spraying or dipping.

A silver layer or alternatively a plated metal layer is applied, 104, onto the carbon layer preferably by dipping.

It is preferred that each layer be at least partially dried prior to coating of the subsequent layer thereon. Alternatively, the layers may be coated in a wet-on-wet fashion with adequate surface tension in each layer to prohibit substantial mixing of the layers. The layers can then be dried, or cured, simultaneously.

The conductive layer, which may be a silver layer, is adhered to the lead frame, 105, with the metallurgical adhesive there between. When the metallurgical adhesive is transient liquid phase sintering adhesive a mixture of the high melting component and low melting component can be applied to either the cathode or the lead frame with the lead frame being preferred. In an alternative embodiment the high melting component and low melting component can be applied to surfaces which are to be joined. By way of example, the high melting component can be applied to the lead frame with the low melting component applied to the layers associated with the cathode. When the cathode and lead frame are brought into intimate contact and heated above the melting point of the low melting component an alloy is formed thereby forming a metallurgical bond. Alternatively, the high melting component can be applied to the cathode and the low melting component applied to the lead frame.

The capacitor is finished, 106, by incorporating anode terminals and external insulators, 107, as known in the art.

The metallurgical adhesive is added, preferably to the cathode lead of the lead frame, by passing the cathode under adhesive dispensers which deposit metallurgical adhesive as desired prior to joining the cathode lead with cathode side of the capacitor. It is preferable to utilize two dispensers wherein they may both dispense metallurgical adhesive, metallurgical adhesive components or one may dispense a metallurgical adhesive with another dispensing a secondary adhesive as will be described herein. For larger case sizes, additional adhesive may be applied in additional locations. It is most preferred that any secondary or additional adhesive, which is not a conductive adhesive, be a snap cured adhesive as described in commonly assigned U.S. Pat. No. 7,554,793 which his incorporated herein by reference.

Figure 3:
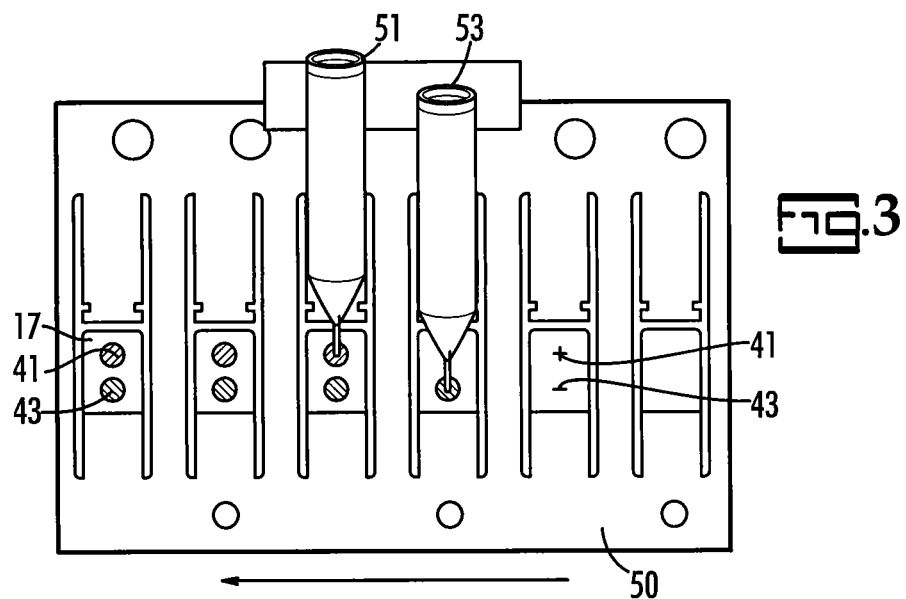
FIG. 3 is a schematic representation of an embodiment of the invention.

FIG. 3 illustrates a process for applying the adhesives. Cathode terminal, 17, which may be one of many on a master plate, 50, passes under adhesive dispensers, 51 and 53, which deposit adhesive on the positive side, 41, or on the negative side, 43, as desired prior to joining the terminal with the cathode side of the capacitor. It would be realized that the dispensers may both dispense a metallurgical adhesive, a component of the metallurgical adhesive in a common location, or one of the dispensers may dispense a secondary adhesive.

Figure 4A:
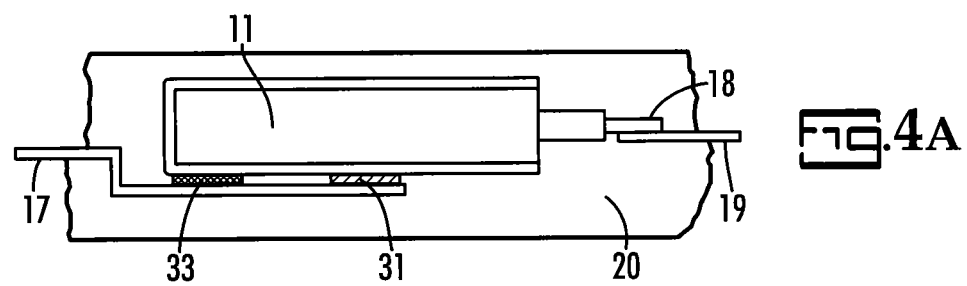
FIGS. 4A and 4B are cross-sectional schematic view of an embodiment of the invention.
Figure 4B:
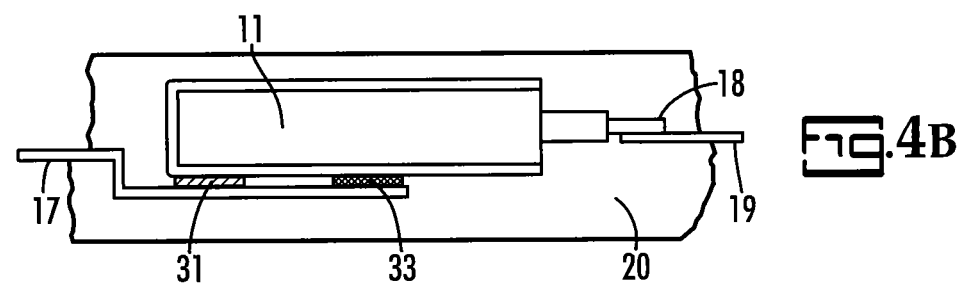

FIGS. 4A and 4B illustrate a method for utilizing the invention. In FIG. 4A a secondary adhesive, 33, is applied on the negative side of the negative lead and a metallurgical adhesive, 31, is applied to the positive side. In FIG. 4B the positions of the metallurgical adhesive and secondary adhesives are reversed.

The resin for the secondary adhesive layer is a silver filled rapid curing resin comprising about 60-95 wt % silver and 5-40 wt % resin. The resin comprises 55-98.9 wt % epoxy monomer, 0.1-15 wt % catalyst, 1-30 wt % accelerant and up to 15 wt % filler.

EXAMPLES

Peel strength testing is used to measure the force required to separate the cathode lead from the cathode. The test can be performed at room temperature, which is referred to as cold peel, or at 162° C., which is referred to as hot peel.

To measure peel strength, a sample strip is placed onto a load plate via locater pins and spring loaded hold down bars. If a hot peel test is to be measured, a heater is turned on with the load plate in the test chamber for a specified time to achieve thermal equilibrium. When ready, the first strip can be loaded and moved into the tester, with the lead-frame side up, where it should wait 1 minute before testing. The first part to be tested is aligned under a pin affixed to a Chatillion gauge. It is aligned to an area where the pin will contact as close to the center of the cathode as possible. The pin shall not contact the leadframe. Once the test has started, the pin will push down on the cathode and the break force is displayed on the gauge. The strip can be repositioned at a minimum distance to each part for additional sampling.

Example 1

A series of identical tantalum anodes were prepared. The tantalum was anodized to form a dielectric on the tantalum anode. A set of samples with a polymeric cathode utilizing polyethylenedioxythiophene (PEDT) was formed on the dielectric and carbon layers were applied. This group of samples were divided into three groups. In the first group a silver layer was applied on the carbon layers. In the second group a nickel layer was plated onto the carbon layer. In a third group, a silver layer was applied followed by a plated metal. The capacitors with polymeric cathode, carbon and various cathode coatings were further split into two groups. In a control group a conventional silver filled polymeric conductive adhesive was applied to the tin lead frame and the capacitor adhered thereto. In the inventive group a transient liquid phase sinterable materials, provided by Ormet Circuits Inc. as CS328, was applied to the leadframe. Both the control and inventive samples were cured at 270° C. for 20 seconds. Some of the parts from the control and the inventive samples were subjected to a hot peel strength test and some were molded and formed for electrical tests. The results of the hot peel test are provided in Table 1. The control samples had average hot peel strength of only 0.07 Kg versus an average of 42 Kg for the inventive samples. The equivalent series resistance (ESR) of both the control and inventive groups were similar. It can be seen that a synergistic improvement in peel strength is observed when nickel coating and transient liquid phase sinterable adhesive were used in conjunction.

TABLE 1

Peel strength at 165° C. for prior art conductive adhesives and metallurgical adhesive

| Cathode coating/adhesive/cathode lead construction | Hot peel (Kg) |
|---|---|
| Silver coating/silver filled adhesive/Sn LF | 0.07 |
| Silver coating/TLPS adhesive/Sn LF | 0.07 |
| Nickel coating/silevr filled adhesive/Sn LF | 0.07 |
| Nickel coating/TLPS adhesive/Sn LF | 0.43 |
| Silver coating/Nickel coating/TLPS adhesive/Sn LF | 0.41 |

Example 2

A series of identical tantalum anodes were prepared. The tantalum was anodized to form a dielectric on the tantalum anode. A manganese dioxide cathode was formed on the dielectric and carbon layers were formed on the manganese dioxide cathode. This group was further divided into two groups. In the first group a silver layer was applied on the carbon. In the second group, a nickel layer was plated on the carbon. These capacitors with the various cathode coating on manganese dioxide cathode were split into two groups. In a control group a snap cure silver filled thermoset adhesive was applied to a lead frame and the capacitor adhered thereto. In the inventive group a polymer solder, referred to as epoxy solder CEP 20048 from Henkel, was applied onto the leadframe. Some of the parts from the control and the inventive samples were subjected to a hot peel strength test and some were molded and formed for electrical tests. The results of the peel strength test are provided in Table 2. ESR of the both control and inventive groups were similar.

TABLE 2

Peel strength at room temperature and 165° C. for prior art conductive adhesives and metallurgical adhesive

| Cathode coating/adhesive/Cathode lead construction | RT peel strength (Kg) | 165 C. Peel Strength (Kg) |
|---|---|---|
| Silver coating/silver filled adhesive/Sn LF | 0.68 | 0.32 |
| Nickel coating/silver filled adhesive/Sn LF | 1.77 | 0.34 |
| Nickel coating/epoxy solder/Sn LF | 2.99 | 1.44 |

Example 3

A series of identical tantalum anodes were prepared. The tantalum was anodized to form a dielectric on the tantalum anode. A manganese dioxide cathode was formed on the dielectric and carbon layers were formed on the manganese dioxide cathode. This group was further divided into two groups. In the first group a silver layer was applied on the carbon. In the second group, a nickel layer was plated on the carbon. These capacitors with the various cathode coating on manganese dioxide cathode were split into two groups. In a control group a snap cure silver filled thermoset adhesive was applied to a lead frame and the capacitor adhered thereto. In the inventive group a transient liquid phase sinterable materials, provided by Ormet Circuits Inc. as CS328, was applied to the leadframe. Some of the parts from the control and the inventive samples were subjected to a 75 C/90% RH humidity test. The results of the Esr shift after exposure to humidity test are provided in Table 3. It can be seen that a synergistic improvement in ESR stability for humidity exposed parts is observed when nickel coating and transient liquid phase sinterable adhesive were used in conjunction.

TABLE 3

Percentage ESR shift after humidity exposure

| Cathode coating/adhesive/Cathode lead construction | Percentage ESR shift after 2600 hrs @76 C./90% RH |
|---|---|
| Silver coating/silver filled adhesive/Sn LF | 462 |
| Nickel coating/silver filled adhesive/Sn LF | 183 |
| Nickel coating/TLPS adhesive/Sn LF | 98 |

The invention has been described with particular reference on the preferred embodiments. One of skill in the art would realize additional embodiments, alterations, and advances which, though not enumerated, are within the invention as set forth more specifically in the claims appended hereto.

The invention claimed is:
1. A solid electrolytic capacitor comprising:
an anode;
a dielectric on said anode;
a cathode on said dielectric;
a conductive coating directly on said cathode; and
a plating directly on said conductive coating wherein said plating is selected from nickel plating and silver plated with nickel; and
a cathode lead electrically connected by metallurgical bonds to said plated metal by a transient liquid phase sinterable material wherein said transient liquid phase sintering adhesive comprises at least one member selected from the group consisting of copper, silver, aluminum, gold, platinum, palladium, beryllium, rhodium nickel, cobalt, iron and molybdenum or an alloy of said member.

2. The solid electrolytic capacitor of claim 1 wherein said plating metal further comprises at least one of copper, gold, silver, tin, palladium and lead.

3. The solid electrolytic capacitor of claim 1 where said cathode comprises a conductive polymer.

4. The solid electrolytic capacitor of claim 1 further comprising a secondary adhesive between said cathode lead and said conductive coating.

5. A solid electrolytic capacitor comprising:
an anode;
a dielectric on said anode;
a cathode on said dielectric;
a conductive coating directly on said cathode; and a plating directly on said conductive coating wherein said plating is selected from nickel plating and silver plated with nickel; and
a cathode lead electrically connected by metallurgical bonds to said plated metal by a transient liquid phase sinterable material wherein said transient liquid phase sintering adhesive comprises at least one member selected from the group consisting of tin, antimony, bismuth, cadmium, zinc, gallium, indium, tellurium, mercury, thallium, selenium and polonium or an alloy said member.

6. The solid electrolytic capacitor of claim 5 wherein said plating metal further comprises at least one of copper, gold, silver, tin, palladium and lead.

7. The solid electrolytic capacitor of claim 5 where said cathode comprises a conductive polymer.

8. The solid electrolytic capacitor of claim 5 further comprising a secondary adhesive between said cathode lead and said conductive coating.

9. A solid electrolytic capacitor comprising:
an anode;
a dielectric on said anode;
a cathode on said dielectric;
a conductive coating directly on said cathode; and a plating directly on said conductive coating wherein said plating is selected from nickel plating and silver plated with nickel; and
a cathode lead electrically connected by metallurgical bonds to said plated metal by a transient liquid phase sinterable material wherein said transient liquid phase sintering adhesive does not comprise lead.

10. The solid electrolytic capacitor of claim 9 wherein said plating metal further comprises at least one of copper, gold, silver, tin, palladium and lead.

11. The solid electrolytic capacitor of claim 9 where said cathode comprises a conductive polymer.

12. The solid electrolytic capacitor of claim 9 further comprising a secondary adhesive between said cathode lead and said conductive coating.

13. A solid electrolytic capacitor comprising:
an anode;
a dielectric on said anode;
a cathode on said dielectric wherein said cathode comprises a conductive polymer;
a conductive coating directly on said cathode; and a plated nickel directly on said conductive coating; and
a cathode lead electrically connected to said conductive coating by a metallurgical bond formed from a transient liquid phase sinterable material.

14. The solid electrolytic capacitor of claim 13 wherein said metallurgical bond is formed under pressure is 0.5 to 4.5 Kilograms/cm².

15. The solid electrolytic capacitor of claim 14 wherein said pressure is 0.6 to 0.8 Kilograms/cm2.

16. The solid electrolytic capacitor of claim 13 wherein said plated metal further comprises at least one of copper, gold, silver, tin, palladium and lead.

17. The solid electrolytic capacitor of claim 13 wherein said cathode lead is plated with metals or alloys with a melting point below 240° C.

18. The solid electrolytic capacitor of claim 17 wherein said metals or alloys with a melting point below 240° C. is selected from the group consisting of tin, antimony, bismuth, cadmium, zinc, gallium, indium, tellurium, mercury, thallium, selenium and polonium or an alloy thereof.

19. The solid electrolytic capacitor of claim 18 wherein said metals or alloys with a melting point below 240° C. is tin.

20. The solid electrolytic capacitor of claim 13 wherein said cathode lead is plated with metal or alloys with a melting point above 300° C.

21. The solid electrolytic capacitor of claim 20 wherein said metal or alloys with a melting point above 300° C. is selected from the group consisting of copper, silver, aluminum, gold, platinum, palladium, beryllium, rhodium, nickel, cobalt, iron and molybdenum.

22. The solid electrolytic capacitor of claim 13 further comprising a secondary adhesive between said cathode lead and said conductive coating.

* * * * *